United States Patent
McDowell

(10) Patent No.: US 11,549,609 B2
(45) Date of Patent: Jan. 10, 2023

(54) BRACKET FOR LOCKING A HANDLE OF AN OIL CONTAINER

(71) Applicant: Alan McDowell, Fostoria, MI (US)

(72) Inventor: Alan McDowell, Fostoria, MI (US)

( * ) Notice: Subject to any disclaimer, the term of this patent is extended or adjusted under 35 U.S.C. 154(b) by 185 days.

(21) Appl. No.: 17/318,732

(22) Filed: May 12, 2021

(65) Prior Publication Data

US 2022/0364659 A1    Nov. 17, 2022

(51) Int. Cl.
*F16K 35/06* (2006.01)

(52) U.S. Cl.
CPC .................... *F16K 35/06* (2013.01)

(58) Field of Classification Search
CPC ........... F16K 35/06; F16K 35/10; F16K 35/12
USPC ........................ 251/90, 101–110; 70/177, 180
See application file for complete search history.

(56) References Cited

U.S. PATENT DOCUMENTS

| | | | | |
|---|---|---|---|---|
| 1,171,453 A * | 2/1916 | Johnson et al. | ........ | F16K 35/10 137/384 |
| 2,943,837 A * | 7/1960 | Noble | ..................... | F16K 35/06 251/110 |
| 3,401,715 A * | 9/1968 | Johnson | ................... | F16K 35/10 137/385 |
| 3,921,955 A * | 11/1975 | Haddad, Jr. | ............. | F16K 1/221 251/297 |
| 3,960,168 A * | 6/1976 | Plympton | ............... | F16K 35/10 137/385 |
| 3,976,095 A * | 8/1976 | Koch | ....................... | F16K 35/06 137/385 |
| 5,647,389 A * | 7/1997 | Holloway | ............. | F16K 31/602 137/15.18 |
| 9,217,514 B1 * | 12/2015 | Bagby | ..................... | F16K 35/06 |
| 9,958,087 B1 * | 5/2018 | Kleppen | ................. | F16K 35/04 |

* cited by examiner

Primary Examiner — Kevin F Murphy
Assistant Examiner — Jonathan J Waddy
(74) Attorney, Agent, or Firm — The Belles Group, P.C.

(57) ABSTRACT

Brackets including a plate having a first, a second, and a third opening, and a channel extending from the plate. The channel has a first and a second end, the first end defining a fourth opening for receiving a handle into the channel. The first opening is positioned over the channel such that when a handle is fully inserted into the channel the opening in the handle would be accessible through the first opening of the plate. The second opening is positioned over the channel such that when the handle is inserted into the channel and a connecting pin is inserted into the second opening and the handle, the handle becomes connected to the bracket. The third opening is positioned to align with the at least one hole in a mounting plate of an oil container valve when the handle is coupled to the stud of the oil container valve.

16 Claims, 9 Drawing Sheets ived rom lue plate.he end, the first enddefining a fourth opening for receiving a handle into the

BRACKET FOR LOCKING A HANDLE OF AN OIL CONTAINER

FIELD OF THE INVENTION

The present disclosure is directed to a bracket and particularly to a bracket for securing a handle of a storage container.

BACKGROUND

Oil producers often use storage containers to store fluids (e.g., gas or liquid) obtained from oil extraction processes prior to shipment and/or regiment processes. The storage containers typically include one or more pipes enabling the fluid to be conveniently transferred into or out of such storage containers. The fluid flow through the pipes of the storage containers is controlled using a valve (referred herein sometimes as an oil container valve).

Oil container valves for controlling fluid flow into oil storage containers typically include a handle coupled to a stud for actuating the valve. As shown in FIG. 7, oil container valves conventionally have a mounting plate with four holes surrounding the stud for securing the handle and the valve in a desired position. For example, conjoining pins may be affixed in two of the holes of the mounting plate on either side of the handle, such that the handle is unable to rotate in a clockwise or counter-clockwise direction into another position, thereby securing the handle in a desired position.

A drawback of the conventional oil valve is that the handle may be removed to expose the stud and an unauthorized individual may rotate the stud with a wrench to actuate the valve.

SUMMARY OF DISCLOSURE

Aspects of the present disclosure are directed to brackets, and particularly to brackets for securing a handle of a storage container valve, as well as systems and methods thereof.

In accordance with an aspect of the disclosure, a bracket is provided for an oil container valve having a stud for actuating the valve, a handle having an opening for coupling to the stud to rotate the stud, and a mounting plate surrounding the stud and defining at least one hole for receiving a conjoining pin. The bracket includes a plate having a first opening, a second opening, and a third opening, and a channel extending from the plate. The channel has a first end and a second end, the first end defining a fourth opening for receiving a handle into the channel. The first opening is positioned over the channel such that when the handle is fully inserted into the channel the opening in the handle would be accessible through the first opening of the plate. The second opening is positioned over the channel such that when the handle is fully inserted into the channel and a connecting pin is inserted into the second opening and the handle, the handle becomes connected to the bracket. The third opening is positioned to align with the at least one hole in the mounting plate of the oil container valve when the handle is coupled to the stud of the oil container valve.

In accordance with an aspect of the disclosure, a bracket system is provided for an oil container valve having a stud for actuating the valve, a handle having an opening for coupling to the stud to rotate the stud, and a mounting plate surrounding the stud and defining at least one hole for receiving a conjoining pin. The bracket system includes a bracket having a plate with a first opening, a second opening, and a third opening, and a channel extending from the plate. The channel has a first end and a second end, the first end defining a fourth opening for receiving a handle into the channel. The first opening is positioned over the channel such that when the handle is fully inserted into the channel the opening in the handle would be accessible through the first opening of the plate. The second opening is positioned over the channel such that when the handle is fully inserted into the channel and a connecting pin is inserted into the second opening and the handle, the handle becomes connected to the bracket. The third opening is positioned to align with the at least one hole in the mounting plate of the oil container valve when the handle is coupled to the stud of the oil container valve. Additionally, the bracket system includes a conjoining pin having a body portion coupled to a head portion. The head portion has a contacting surface for stopping the insertion of the conjoining pin into the third opening. The body portion has a slot extending laterally through the body portion. The slot is configured to receive a lock.

According to yet a further aspect, an oil container valve is provided including a stud for actuating the valve; a handle coupled to the stud for rotating the stud; a mounting plate radially surrounding the stud and defining at least one hole for receiving a conjoining pin for hindering rotation of the handle. A bracket is coupled to the handle for rotationally securing the handle relative to the mounting plate. The bracket includes a plate having a first opening, a second opening, and a third opening, as well as a channel extending from the plate. The channel has a first end and a second end. The first end defines a fourth opening, wherein the handle is fully inserted into the channel through the fourth opening. The first opening is positioned over the channel such that the stud is inserted into the opening in the handle through the first opening of the plate. The second opening is positioned over the channel such that the connecting pin is inserted into the handle through the second opening to connect the handle to the bracket. The third opening is positioned such that a conjoining pin is inserted into the at least one hole of the mounting plate through the third opening to rotationally secure the handle relative to the mounting plate.

DRAWINGS

Various embodiments in accordance with the present disclosure will be described with reference to the drawings, in which.

DETAILED DESCRIPTION

Figure 1:
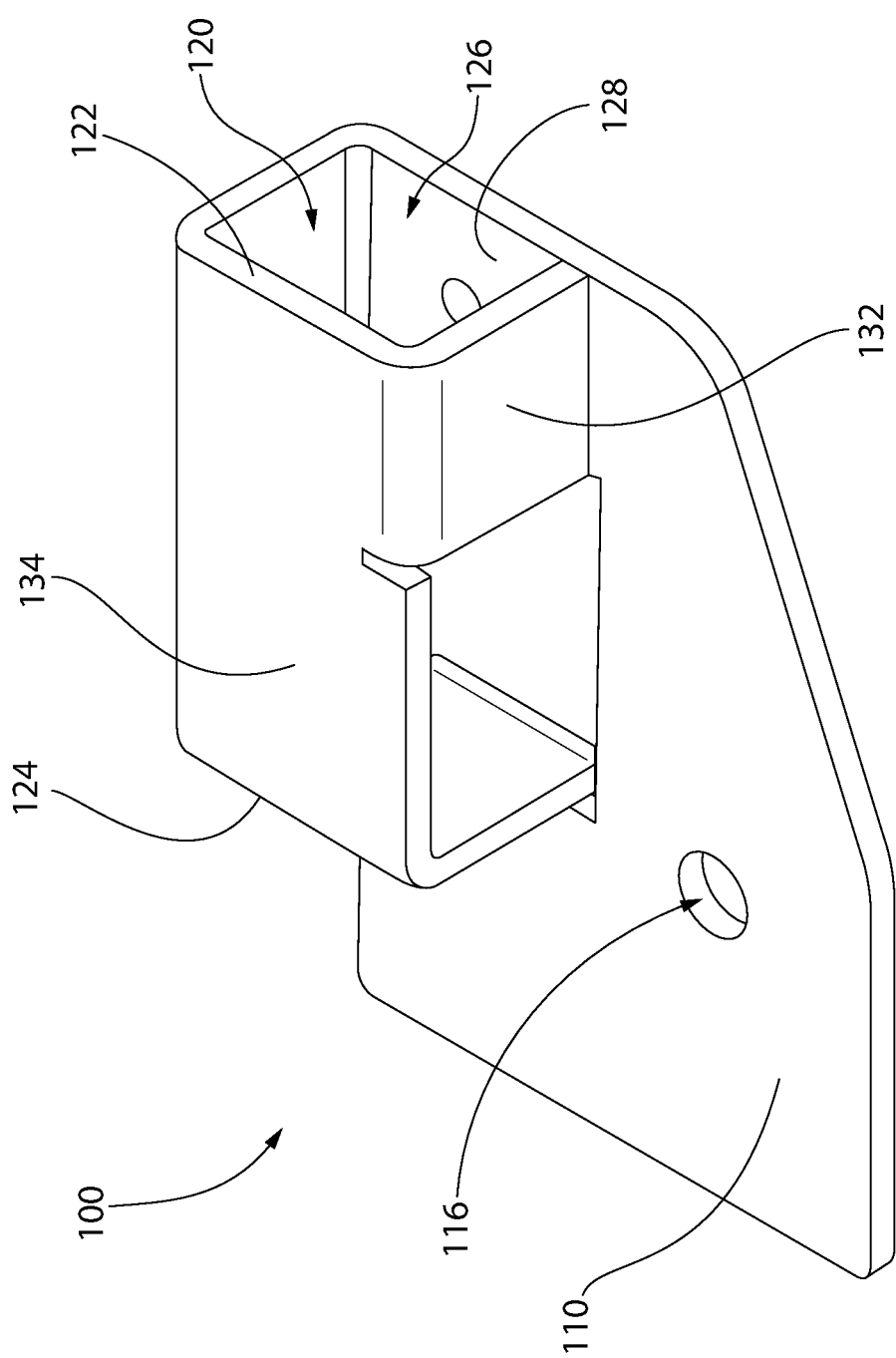
FIG. 1 depicts a perspective view of a non-limiting example of a bracket in accordance with aspects of the disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., re labels to distinguish components or blocks of otherwise similar names, but does not imply any sequence or numerical limitation. When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure.

Shapes as described herein are not considered absolute. As is known in the art, surfaces often have waves, protrusions, holes, recesses, etc. to provide rigidity, strength and functionality. All recitations of shape (e.g., cylindrical) herein are to be considered modified by "substantially" regardless of whether expressly stated in the disclosure or claims, and specifically accounts for variations in the art as noted above.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments The specification and drawings are to be regarded in an illustrative rather than a restrictive sense. It will, however, be evident that various modifications and changes may be made thereunto without departing from the broader spirit and scope of the invention as set forth in the claims.

Aspects of the present disclosure are directed to brackets, and particularly to brackets for securing a handle of a valve that controls the flow of fluid; the disclosure is presented in the context of an oil valve, although it is to be understood that the invention is not limited to oil as the fluid. The brackets disclosed herein may be mounted onto the handle of an oil container valve currently in operation for controlling the fluid flow through a pipe to a storage container. The brackets restrict rotation of the handle and enable easy identification of tampering or attempts to tamper with the handle and/or stud of the oil container valve.

FIG. 1 depicts a perspective view of a non-limiting example of a bracket 100 in accordance with aspects of the disclosure. As a general overview, bracket 100 includes a plate 110 having at least a first opening 112, a second opening 114, and a third opening 116. Bracket 100 further includes a channel 120 extending from plate 110 for receiving a handle of an oil container valve.

Figure 2:
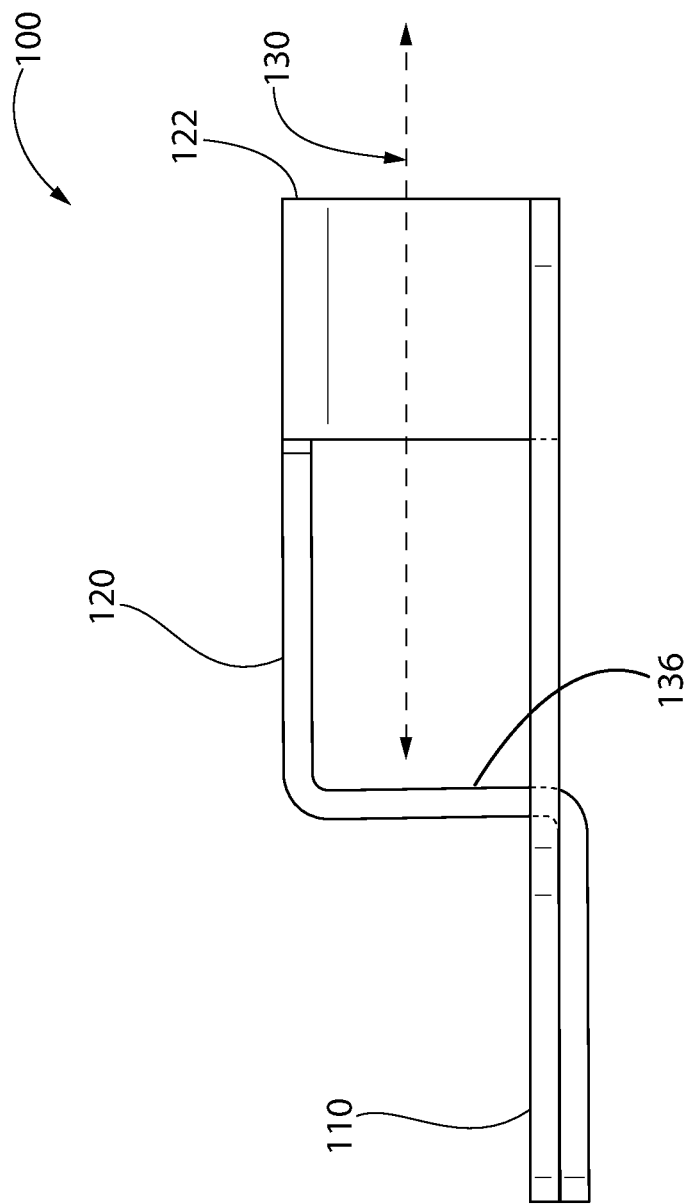
FIG. 2 depicts a cross-sectional side view of the bracket of FIG. 1.

Plate 110 has a channel 120 extending from plate 110. Channel 120 has a first end 122 and a second end 124. Channel 120 includes an inner surface 128 that extends from first end 122 toward second end 124. In one embodiment, channel 120 has a longitudinal axis 130 and a rectangular cross section. Although channel 120 is illustrated in FIGS. 1 and 2 as having a rectangular cross section, the invention is not limited thereto, and channel 120 may be configured in alternative embodiments to have a cylindrical cross section, triangular cross section, pentagonal cross section, hexagonal cross section, heptagonal cross section, octagonal cross section, decagonal cross section, or other shape as appropriate. Preferably, channel 120 has a cross section that corresponds to the cross-section of the handle of the oil container valve, such that the space between inner surface 128 of channel 120 and the handle is 2 millimeter or less, preferably 1 millimeter or less, or preferably 0.8 millimeters or less.

Channel 120 may have a first portion 132 and a second portion 134. First portion 132 of channel 120 is enclosed in a radial direction. For example, the cross-sectional perimeter of first portion 132 of channel 120 may be delineated by inner surface 128 of channel 120, such that first portion 132 of channel 120 is enclosed in a radial direction. Inner surface 128 may form one or more sides of channel 120; e.g., inner surface may form two opposed sides in the radial direction, three sides in the radial direction, or four sides in the radial direction. In one embodiment, first portion 132 is enclosed in the radial direction by four sides. Second portion 134 of channel 120 channel is partially enclosed in the radial direction. As illustrated in FIG. 1, channel 120 may be configured such that inner surface 128 does not delineate a section of the perimeter of second portion 134 of channel 120, such that a section of second portion 134 is open and/or second portion 134 is partially enclosed in a radial direction. Second portion 134 may be open in at least two directions perpendicular to longitudinal axis 130.

First end 122 defines a fourth opening 126 for receiving a handle into channel 120. Fourth opening 126 may have a cross section that is about the same or the same size as a cross section of first portion 132 and/or second portion 134 of channel 120. In one embodiment, however, fourth opening 126 may have a cross section that is larger than a cross section of first portion 132 and/or second portion 134 of channel 120 for guiding a handle into channel 120. A wall 136 connects second end 124 of channel 120 to plate 110. Wall 136 defines a stop for the insertion of a handle into channel 120.

Figure 3:
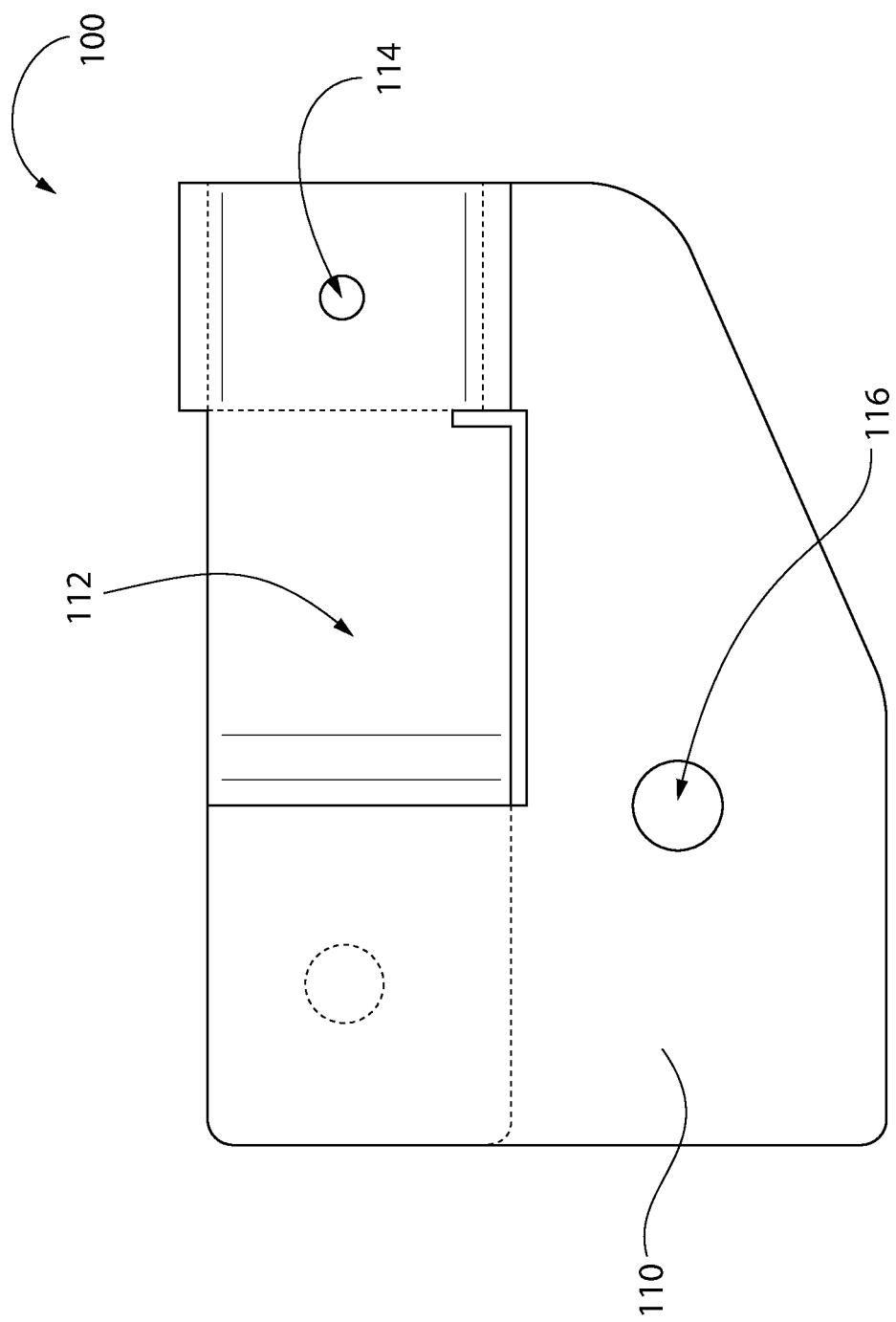
FIG. 3 depicts a bottom view of the bracket of FIG. 1.

Referring to FIG. 3, as noted above plate 110 has a first opening 112, a second opening 114, and a third opening 116. First opening 112 is positioned over channel 120 such that when a handle of an oil container valve is fully inserted into channel 120 an opening in the handle would be accessible through first opening 112 of plate 110.

Second opening 114 is positioned over channel 120 such that when the handle of an oil container valve is fully inserted into channel 120, a connecting pin (e.g., 420 in FIG. 5) may be inserted into second opening 114 and the handle of the oil container valve to connect the handle of the oil container valve to bracket 100. Second opening 114 is, preferably, positioned over first portion 132 of channel 120. The connecting pin may be a rivet, a screw, a nail, or the like.

In at least one instance, the connecting pin is a pressure rivet. In at least one other instance, the connecting pin is a tamper proof screw. The invention is not limited to the nature of the connection other than that the connection should either be permanent (cannot be removed absent destructive force that would break the pin) or security based (requiring specialized removal tools such as hex head or square head screws) to prevent easy removal of the pin.

Third opening 116 is positioned to align with the at least one hole in the mounting plate of the oil container valve when the handle of the oil container valve is coupled to the stud of the oil container valve. Third opening 116 may have a beveled edge. In one embodiment, however, third opening 116 does not have a beveled edge. Third opening 116 may receive a conjoining pin adapted to be positioned within one of the holes of the mounting plate of the oil container valve.

Figure 4:
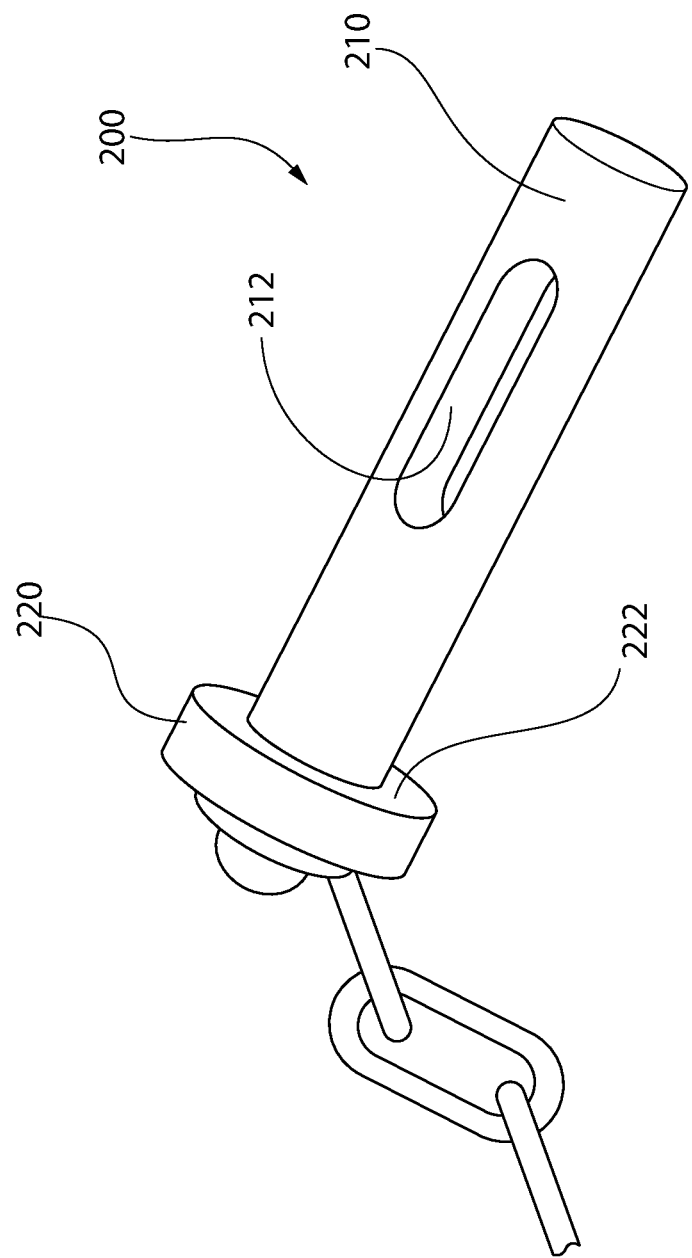
FIG. 4 is side view of a non-limiting example of a conjoining pin in accordance with aspects of the disclosure.

FIG. 4 depicts a non-limiting example of a conjoining pin 200 according to aspects of the disclosure. Conjoining pin 200 has a body portion 210 coupled to a head portion 220. Head portion 220 has a contacting surface 222 for stopping the insertion of conjoining pin 200 into and/or through third opening 116 of bracket 100. Head portion 220 typically has a cross-sectional diameter that is greater than a cross-sectional diameter of body portion 210.

Figure 9:
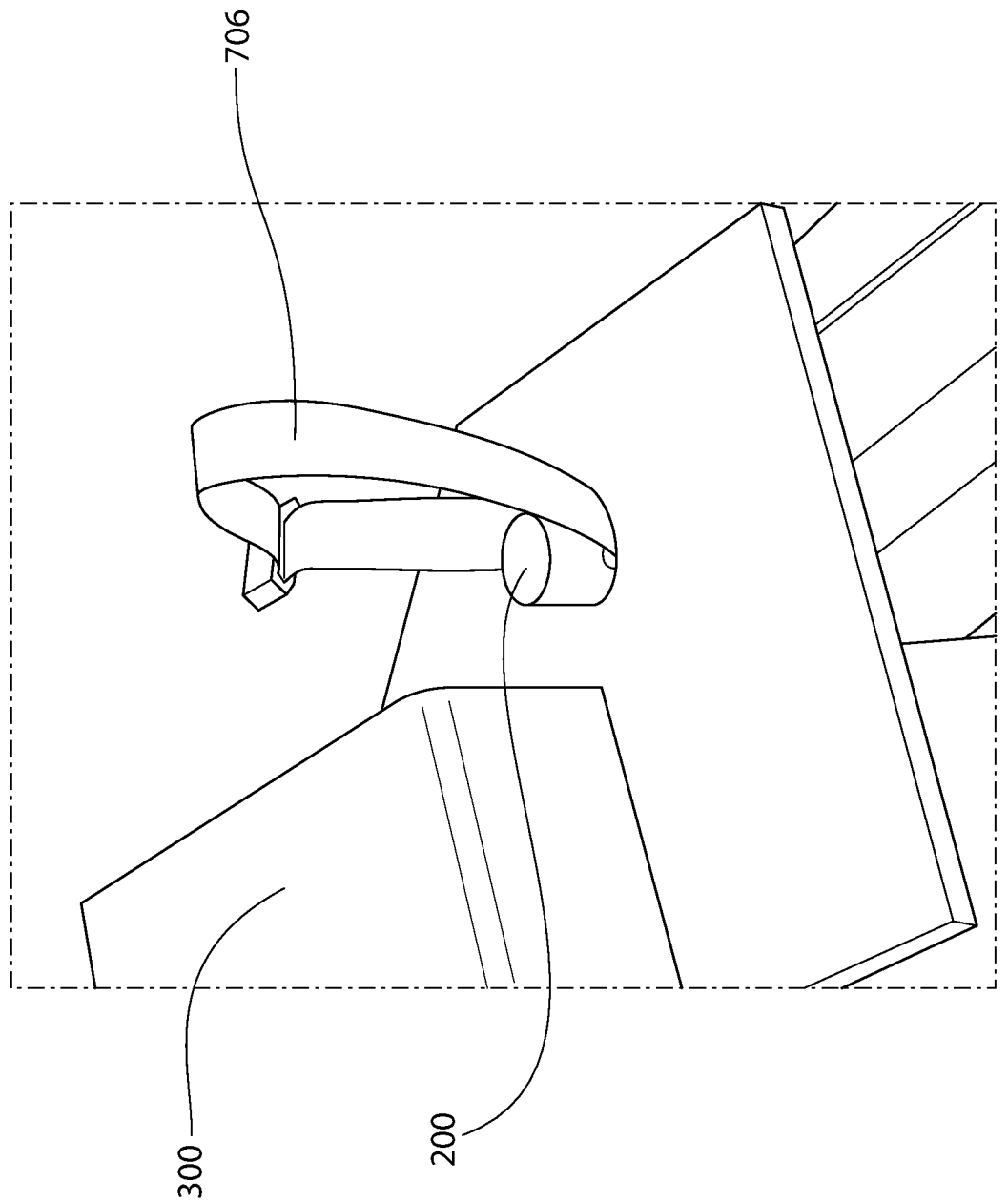
FIG. 9 shows an embodiment of a non-limiting example of lock.

Body portion 210 may be cylindrical and/or have a circumferential cross section. Body portion 210 has a slot 212 extending laterally through body portion 210. Slot 212 is configured to receive a lock (e.g., 706 in FIG. 9). The lock may be flexible and/or formed from a flexible material. For example, the lock may be flexible, such that the lock can bend at least 10° without plastic deformation. Suitable locks include, but are not limited to, zip-ties, chains, ropes, or flexible metal sheets. Each lock preferable includes a unique identifier (e.g., serial number) imprinted thereon or incorporated therein, such that if the lock were broken and replaced an ID check of the lock would show that the lock has been changed. For example, lock 706, as shown in FIG. 9, is formed of a flexible metal material that has been inserted through slot 212 of conjoining pin 200 with the ends of lock 706 coupled to each other to form a loop. Lock 706 has etches and/or indents that form a unique identifier.

Figure 5:
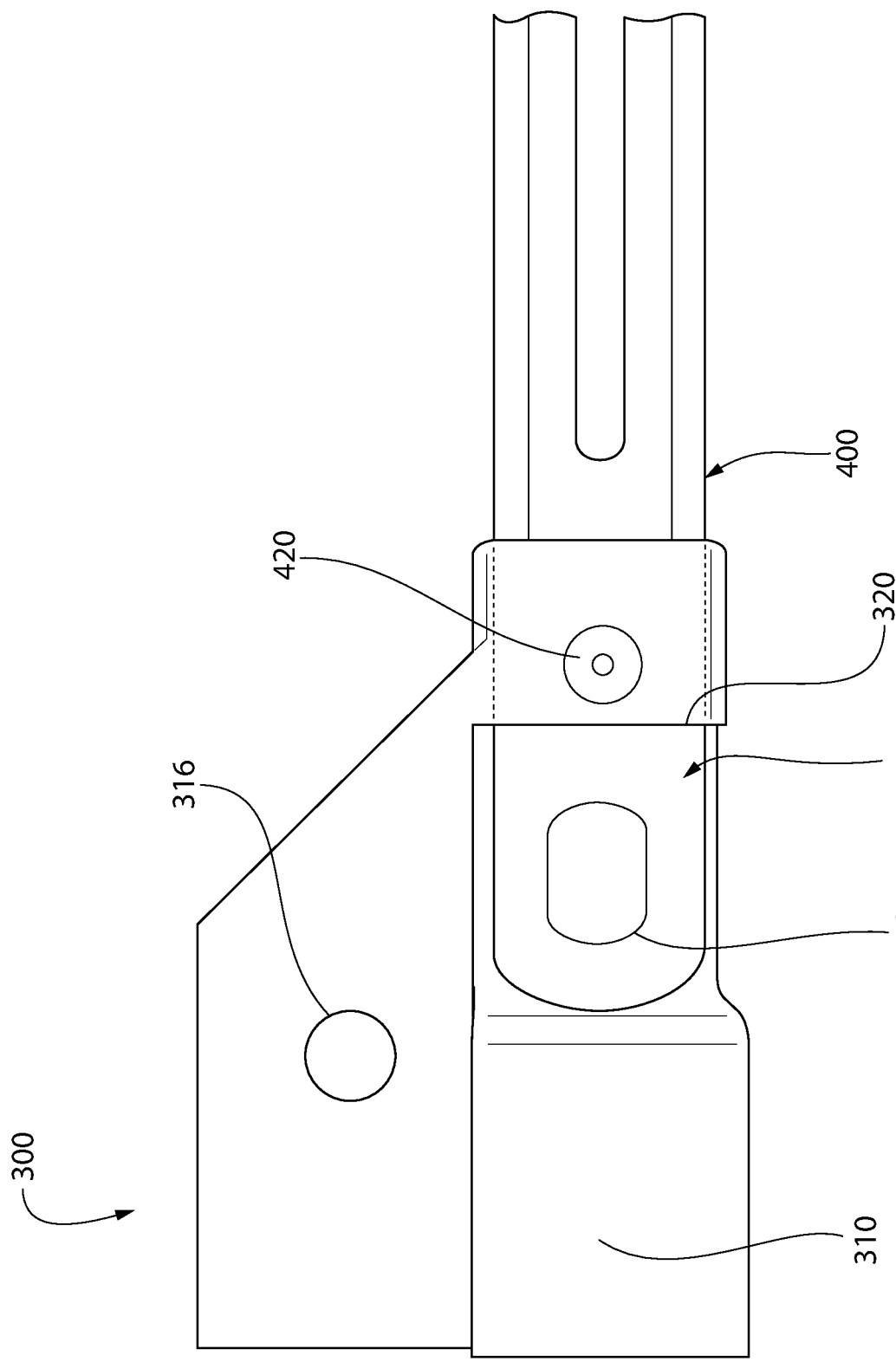
FIG. 5 is a bottom view of another non-limiting example of a bracket according to aspects of the disclosure.
Figure 6:
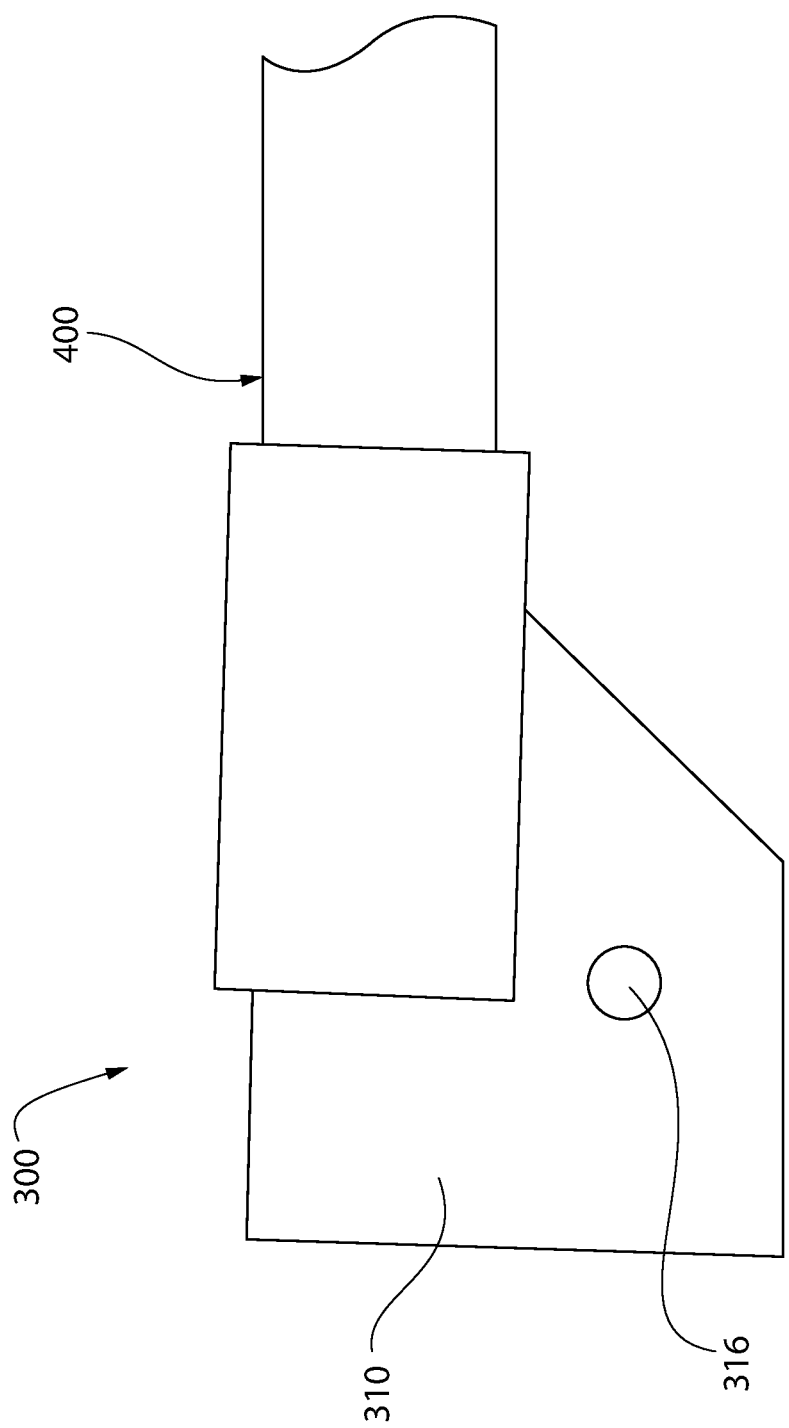
FIG. 6 is a top view of the bracket of FIG. 5.

FIGS. 5 and 6 depict another non-limiting example of a bracket 300 mounted on a handle 400 Bracket 300 is an inverted version of bracket 100, but otherwise has the same features. As a general overview, bracket 300 includes a plate 310 have at least a first opening 312, a second opening 314, and a third opening 316. Bracket 300 also includes a channel 320 extending from plate 310 for receiving a handle.

Handle 400 has an opening 410 that couples to the stud of an oil container valve such that rotation of handle 400 rotates the stud and actuates the oil container valve. Handle 400 inserts into channel 320 of bracket 300. Plate 310 of bracket 300 has an opening 312 positioned over channel 320 such that opening 410 of handle 400 is accessible through first opening 312 of plate 310 The second opening of plate 310 is positioned over channel 320 such that connecting pin 420 may be inserted into the second opening of plate 310 when handle 400 is fully inserted into channel 320 to secure bracket 300 to handle 400. When connected by connecting pin 420, the handle is rotationally locked with bracket 300. As discussed below, when bracket 300 is locked into place, this will prevent rotation of handle 400 and thus prevent unauthorized actuation of the valve.

Third opening 316 of bracket 300 is positioned to align with the at least one hole in the mounting plate of the oil container valve when handle 400 of the oil container valve is coupled to the stud of the oil container valve. Third opening 116 may receive conjoining pin 200, which is adapted to be positioned within one of the holes of the mounting plate of the oil container valve.

Bracket 100 and 300 are installed as discussed below, although for purposes of brevity discussion will be limited to bracket 300; it is to be understood that bracket 100 is installed in the same manner. The invention is not limited to the below sequence, and the steps may be rearranged as appropriate.

Handle 400 is removed from its supporting stud of the oil valve that it controls. Handle 400 is then inserted into bracket 100/300 as described above and secured by connecting pin 420. Handle 400 is then remounted onto the supporting stud in a position by which third opening 116/316 aligns with corresponding holes in the mounting plate of the valve. Conjoining pin 200 is then inserted into the aligned third opening 116/316 and the corresponding holes in the mounting plate of the valve; this rotationally locks bracket 100/30 in place, to rotationally secure a handle 400 so it cannot be used to actuate the valve. In at least one instance, inserting conjoining pin 200 through third opening 116/316 rotationally secures the handle and inhibits the handle and/or stud from being rotated by more than 15°. Inserting the lock through the slot of conjoining pin 200 prevents the bracket 100/300 from being removed absent destructive force on the lock, which could be detected by either the absence of the lock or replacement of the lock with a different lock that lacked the unique identifier.

Figure 7:
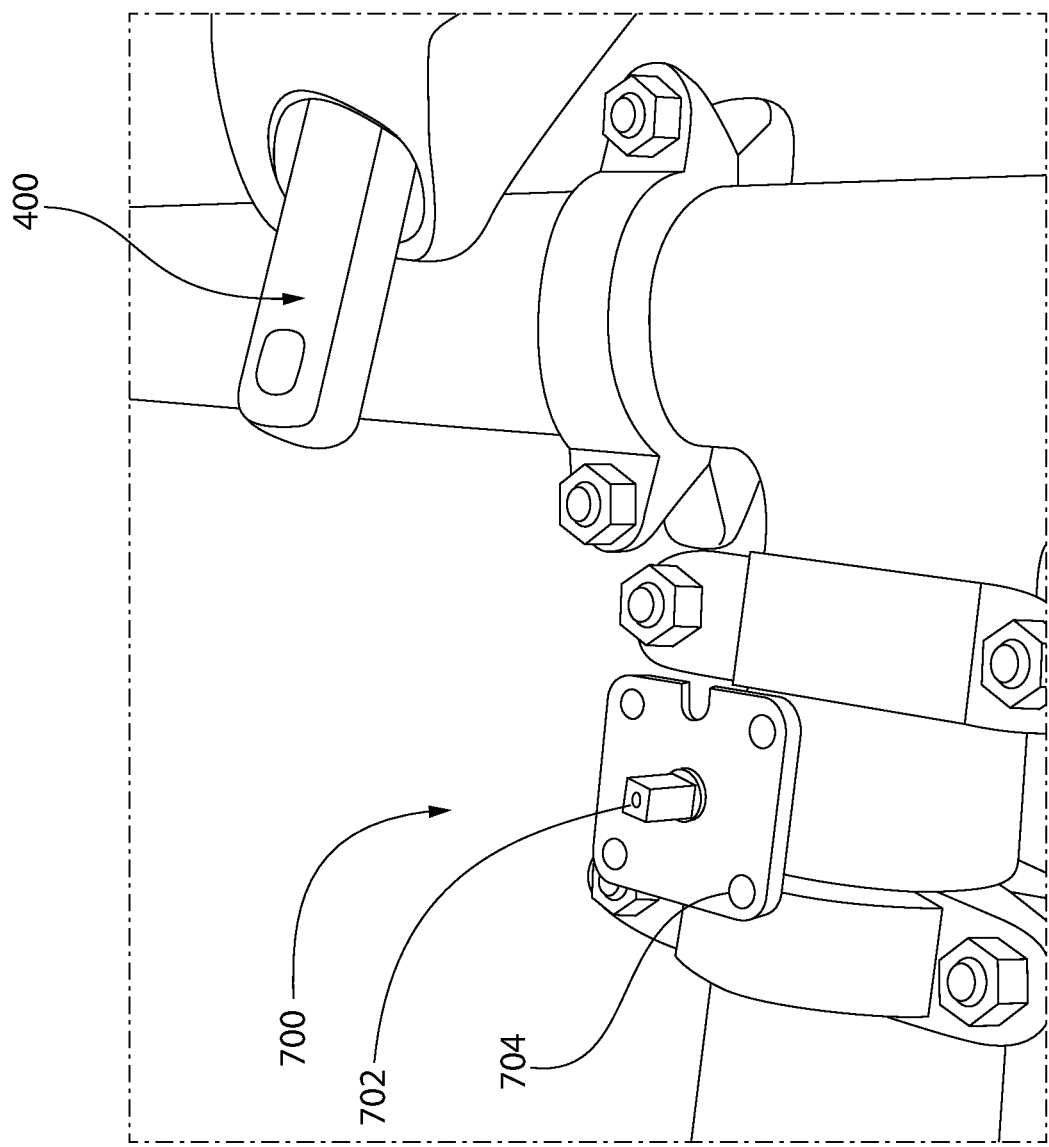
FIG. 7 is a top view of a prior art oil container valve with the handle removed to reveal the stud, the mounting plate, and the holes through the mounting plate for receiving a conjoining pin.
Figure 8:
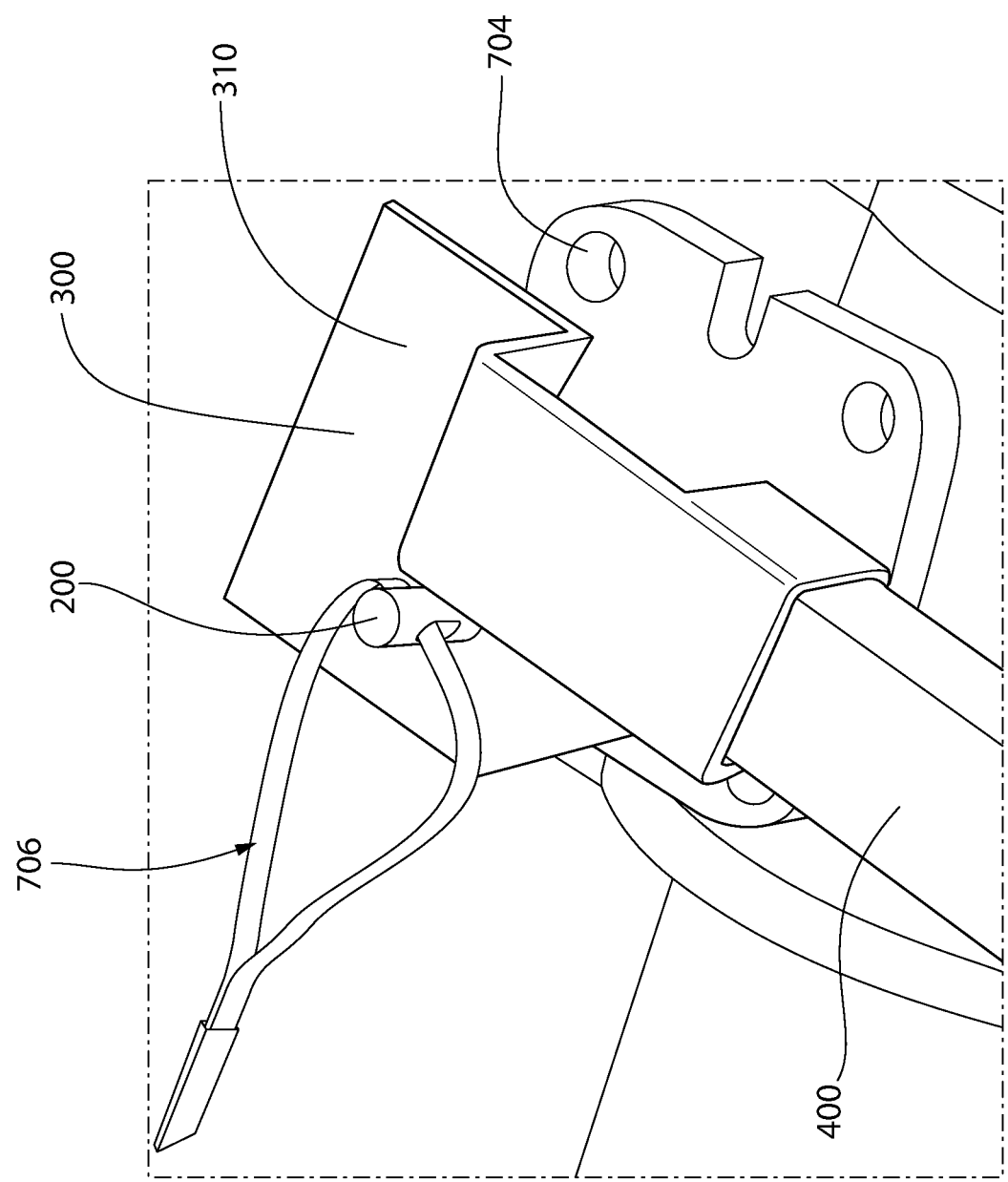
FIG. 8 is a top view of a handle with a bracket of FIG. 5 mounted on the oil container valve of FIG. 7, with the third opening of the bracket aligning with a hole of the mounting plate to receive a conjoining pin and a lock.

FIG. 7 shows an oil container valve 700 per the prior art with handle 400. The oil container valve includes handle 400, stud 702, and openings 704 through which conjoining pin 200 may pass as discussed above. FIG. 8 shows oil container valve 700 with bracket 300 mounted therein, with third opening 316 aligning with holes 704 to receive conjoining pin 200 and secured by lock 706 in the form of a zip tie bearing a serial number. When secured as in FIG. 8, handle 400 cannot be used to actuate oil valve 700 absent removal of lock 706.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A bracket for an oil container valve, the oil container valve having a stud for actuating the valve, a handle having an opening for coupling to the stud to rotate the stud, and a mounting plate surrounding the stud and defining at least one hole for receiving a conjoining pin, the bracket comprising:
   a plate having a first opening, a second opening, and a third opening;
   a channel extending from the plate, the channel having a first end and a second end, the first end defining a fourth opening for receiving the handle into the channel;
   the first opening being positioned over the channel such that when the handle is fully inserted into the channel the opening in the handle would be accessible through the first opening of the plate;
   the second opening being positioned over the channel such that when the handle is fully inserted into the channel and a connecting pin is inserted into the second opening and the handle, the handle becomes connected to the bracket; and
   the third opening being positioned to align with the at least one hole in the mounting plate of the oil container valve when the handle is coupled to the stud of the oil container valve.

2. The bracket of claim 1, wherein the third opening has a beveled edge.

3. The bracket of claim 1, wherein the channel has a first portion and a second portion, the first portion of the channel is enclosed in a radial direction and the second portion of the channel is partially enclosed in the radial direction.

4. The bracket of claim 3, wherein the first portion is enclosed in the radial direction by four sides.

5. The bracket of claim 3, wherein the channel has a longitudinal axis and the second portion is open in at least two directions perpendicular to the longitudinal axis.

6. The bracket of claim 1, wherein the channel has a longitudinal axis and has a rectangular cross section.

7. The bracket of claim 1 further comprising a wall connecting the second end of the channel to the plate, the wall defining a stop for the insertion of the handle into the channel.

8. The bracket of claim 1, wherein the connecting pin is a rivet or screw.

9. A bracket system for an oil container valve, the oil container valve having a stud for actuating the valve, a handle having an opening for coupling to the stud to rotate the stud, and a mounting plate surrounding the stud and defining at least one hole for receiving a conjoining pin, the bracket system comprising:
   a bracket having:
     a plate having a first opening, a second opening, and a third opening, a channel extending from the plate, the channel having a first end and a second end, the first end defining a fourth opening for receiving the handle into the channel,
     the first opening being positioned over the channel such that when the handle is fully inserted into the channel the opening in the handle would be accessible through the first opening of the plate,
     the second opening being positioned over the channel such that when the handle is fully inserted into the channel and a connecting pin is inserted into the second opening and the handle, the handle becomes connected to the bracket, and
     the third opening being positioned to align with the at least one hole in the mounting plate of the oil container valve when the handle is coupled to the stud of the oil container valve, and
   the conjoining pin having:
     a body portion coupled to a head portion, the head portion having a contacting surface for stopping the insertion of the conjoining pin into the third opening, the body portion having a slot extending laterally through the body portion, wherein the slot is configured to receive a lock.

10. The bracket system of claim 9, further comprising the lock, wherein the lock is flexible.

11. The bracket system of claim 10, wherein the lock is a zip-tie, chain, rope, or flexible metal sheet.

12. An oil container valve comprising:
   a valve coupled to a stud for actuating the valve;
   a handle coupled to the stud for rotating the stud;
   a mounting plate radially surrounding the stud and defining at least one hole for receiving a conjoining pin for hindering rotation of the handle; and a bracket coupled to the handle for rotationally securing the handle relative to the mounting plate, the bracket comprising:
- a plate having a first opening, a second opening, and a third opening;
- a channel extending from the plate, the channel having a first end and a second end, the first end defining a fourth opening, wherein the handle is fully inserted into the channel through the fourth opening,
- the first opening being positioned over the channel such that the stud is inserted into an opening in the handle through the first opening of the plate,
- the second opening being positioned over the channel such that a connecting pin is inserted into the handle through the second opening to connect the handle to the bracket,
- the third opening is configured to receive the conjoining pin.

13. The oil container valve of claim 12, wherein the conjoining pin has a slot extending laterally through a body portion, the slot being configured to receive a lock.

14. The oil container valve of claim 13, wherein the lock is a zip-tie, chain, rope, or flexible metal sheet.

15. The oil container valve of claim 12, wherein the third opening has a beveled edge.

16. The oil container valve of claim 12, wherein the connecting pin is a rivet or screw.

* * * * *